United States Patent
Block et al.

(10) Patent No.: US 12,512,129 B2
(45) Date of Patent: Dec. 30, 2025

(54) GAS REPLENISHMENT COMPONENT FOR AN ENCLOSURE

(71) Applicant: Donaldson Company, Inc., Bloomington, MN (US)

(72) Inventors: Joseph M. Block, Carver, MN (US); Daniel L. Tuma, Saint Paul, MN (US); Bradly G. Hauser, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 18/756,635

(22) Filed: Jun. 27, 2024

(65) Prior Publication Data

US 2024/0428830 A1 Dec. 26, 2024

Related U.S. Application Data

(63) Continuation of application No. 17/637,038, filed as application No. PCT/US2020/047517 on Aug. 21, 2020, now Pat. No. 12,057,144.

(60) Provisional application No. 62/890,478, filed on Aug. 22, 2019.

(51) Int. Cl.
   *G11B 33/14* (2006.01)
(52) U.S. Cl.
   CPC ........ *G11B 33/1486* (2013.01); *G11B 33/144* (2013.01); *G11B 33/1446* (2013.01)
(58) Field of Classification Search
   None
   See application file for complete search history.

(56) References Cited

U.S. PATENT DOCUMENTS

| | | | | |
|---|---|---|---|---|
| 5,293,286 | A | * | 3/1994 | Hasegawa .......... G11B 33/1453 |
| 5,636,081 | A | | 6/1997 | Higashiya et al. |
| 5,958,479 | A | | 9/1999 | Roitberg et al. |
| 6,214,095 | B1 | | 4/2001 | Logan et al. |
| 6,317,286 | B1 | * | 11/2001 | Murphy ............. G11B 33/1486 |
| | | | | 360/97.13 |

(Continued)

FOREIGN PATENT DOCUMENTS

| CN | 1961375 A | 5/2007 |
|---|---|---|
| EP | 1 756 831 A2 | 2/2007 |

(Continued)

OTHER PUBLICATIONS

Labthink, "Data Report for Oxygen Permeability Test of Polycarbonate", 2016, Labthink Instruments Co. Ltd., Jinan, China and Boston, Massachusetts, USA, 7 pages (including PDF and online printout for date). Available online at http://en.labthink.com/en-us/literatures/Ddta-report-for-oxygen-permeability-test-ofpolycarbonate.html. Obtained from the internet Feb. 19, 2022 and Jan. 19, 2023.

(Continued)

*Primary Examiner* — William J Klimowicz
(74) *Attorney, Agent, or Firm* — Mueting Raasch Group

(57) ABSTRACT

A gas replenishment component for an electronic enclosure is described. A main body defines a containment volume. The main body is sealed about the containment volume. A charging gas is contained in the containment volume. The containment volume has less than 5% $N_2$. The main body defines a diffusive area that is permeable to the gas. A reversible seal obstructs the diffusive area.

16 Claims, 3 Drawing Sheets

(56) References Cited

U.S. PATENT DOCUMENTS

| | | | |
|---|---|---|---|
| 6,560,064 B1* | 5/2003 | Hirano | G11B 33/1413 |
| | | | 360/97.12 |
| 8,760,797 B1 | 6/2014 | Beatty et al. | |
| 8,867,164 B2 | 10/2014 | Brown | |
| 8,885,287 B1 | 11/2014 | Koike et al. | |
| 8,934,194 B2* | 1/2015 | Schreck | G11B 25/043 |
| | | | 360/97.12 |
| 9,114,349 B2* | 8/2015 | Leier | B01D 53/0446 |
| 9,588,105 B1 | 3/2017 | Hussain et al. | |
| 10,153,005 B1* | 12/2018 | Ayanoor-Vitikkate | |
| | | | G11B 33/1466 |
| 10,373,632 B2 | 8/2019 | Brand et al. | |
| 12,057,144 B2 | 8/2024 | Block et al. | |
| 2003/0081349 A1 | 5/2003 | Bernett | |
| 2005/0264926 A1 | 12/2005 | Burts-Cooper et al. | |
| 2005/0270690 A1 | 12/2005 | Gunderson | |
| 2006/0032931 A1 | 2/2006 | Gunderson | |
| 2007/0289971 A1 | 12/2007 | Olszewski | |
| 2009/0325263 A1 | 12/2009 | Ponaka et al. | |
| 2012/0145940 A1 | 6/2012 | Tuma | |
| 2013/0170074 A1 | 7/2013 | Hayakawa et al. | |
| 2014/0116254 A1 | 5/2014 | Leier et al. | |
| 2017/0178695 A1 | 6/2017 | Miller, III et al. | |
| 2022/0301596 A1 | 9/2022 | Block et al. | |

FOREIGN PATENT DOCUMENTS

| | | | |
|---|---|---|---|
| EP | 1 756 831 B1 | 11/2007 | |
| WO | 2003041081 A1 | 5/2003 | |
| WO | 2005117018 A2 | 12/2005 | |
| WO | 2009012188 A2 | 1/2009 | |
| WO | 2012094434 A1 | 7/2012 | |
| WO | WO-2021035185 A1 * | 2/2021 | G11B 33/144 |

OTHER PUBLICATIONS

Decoste, et al., "Metal-Organic Frameworks for Oxygen Storage", 2014, Angewandte Chemie International Edition, 53(51):14092-14095.

Kasai, et al., "Perfluoropolyethers: Intramolecular Disproportionation", 1992, Macromolecules, 25:6791-6799. Available online at pubs.acs.org. Obtained from the internet on May 27, 2020.

Wang, et al., "High Pressure Excess Isotherms for Adsorption of Oxygen and Nitrogen in Zeolites", Jul. 11, 2011, Langmuir, 27:10648-10656.

International Patent Application No. PCT/US2020/047517, filed Aug. 21, 2020; PCT International Preliminary Report on Patentability, issued Feb. 17, 2022, 10 pages.

International Patent Application No. PCT/US2020/047517, filed Aug. 21, 2020; PCT International Search Report and Written Opinion issued Nov. 24, 2020, 13 pages.

* cited by examiner

GAS REPLENISHMENT COMPONENT FOR AN ENCLOSURE

CROSS REFERENCE TO RELATED APPLICATIONS

This application is a continuation of U.S. application Ser. No. 17/637,038, filed Feb. 21, 2022, which is the § 371 U.S. National Stage of International Application No. PCT/US2020/047517, filed Aug. 21, 2020, which claims the benefit of U.S. Provisional Application No. 62/890,478, filed Aug. 22, 2019, the disclosures of which are incorporated by reference herein in their entireties.

TECHNOLOGICAL FIELD

The present disclosure is generally related to enclosures. More particularly, the present disclosure is related to gas replenishment component for an enclosure.

BACKGROUND

Some electronic enclosures can incorporate one or more gases that aid in the operation and maintenance of the enclosure. For example, some electronic enclosures, such as disk drives, are sealed systems filled with an inert gas such as helium. The helium can have advantages such as limiting heat transfer to disk drive components and reducing air turbulence within the disk drive. As another example, as recognized in U.S. Pat. No. 8,885,287 B1, the presence of oxygen can contribute to the reduction of contamination from the disk drive through oxidation.

Disk drives, such as those used to store digitized data for use with, e.g., computers and other data processing systems, may include one or more data storage disks or other components configured to store data magnetically, optically, and/or through any other suitable physical phenomenon.

SUMMARY

Some embodiments of the current technology relate to a gas replenishment component for an electronic enclosure. A main body defines a containment volume. The main body is sealed about the containment volume. A charging gas is contained in the containment volume. The containment volume has less than 5% $N_2$. The main body defines a diffusive area that is permeable to the gas. A reversible seal obstructs the diffusive area.

In some such embodiments, the gas replenishment has an adsorbent disposed in the containment volume, wherein the charging gas is at least partially stored by the adsorbent. Additionally or alternatively, the charging gas includes $O_2$. Additionally or alternatively, the charging gas includes He. Additionally or alternatively, the containment volume has a pressure ranging from 85 kPa to 1000 kPa. Additionally or alternatively, the main body does not define an opening and is constructed of a material that is configured to diffuse the charging gas therethrough. Additionally or alternatively, the main body is constructed of polycarbonate. Additionally or alternatively, the gas replenishment component has a removable seal, where the main body defines a diffusion channel extending from outside the main body to the containment volume, and the removable seal is disposed across the diffusion channel.

Some embodiments of the technology disclosed herein relate to a method of constructing a gas replenishment component. The adsorbent is dried by heating the adsorbent under a partial vacuum. The dried adsorbent is charged with a gas. The adsorbent is inserted in a containment volume of a main body. The adsorbent is sealed in the main body.

In some such embodiments, charging the dried adsorbent with gas includes injecting the gas through a self-sealing septum of the main body. Additionally or alternatively, charging the adsorbent with gas includes lowering the temperature of the adsorbent. Additionally or alternatively, charging the adsorbent with gas includes increasing the pressure on the adsorbent. Additionally or alternatively, the containment volume is filled with He to pressurize the containment volume. Additionally or alternatively, the gas comprises $O_2$. Additionally or alternatively, the gas contained in the main body is at a partial pressure that exceeds the partial pressure of the gas at atmospheric conditions at sea level.

Additionally or alternatively, the main body does not define an opening and is constructed of a material that is configured to diffuse the gas therethrough. Additionally or alternatively, the main body is constructed of polycarbonate. Additionally or alternatively, a seal is disposed across a diffusion channel, wherein the main body defines the diffusion channel that extends from outside the main body to the containment volume. Additionally or alternatively, a reversible seal is removed from the main body to expose a diffusive area of the main body. Additionally or alternatively, the reversible seal is punctured. Additionally or alternatively, the reversible seal is detached from the main body.

BRIEF DESCRIPTION OF THE DRAWINGS

The present technology may be more completely understood and appreciated in consideration of the following detailed description of various embodiments in connection with the accompanying drawings.

DETAILED DESCRIPTION

Figure 1:
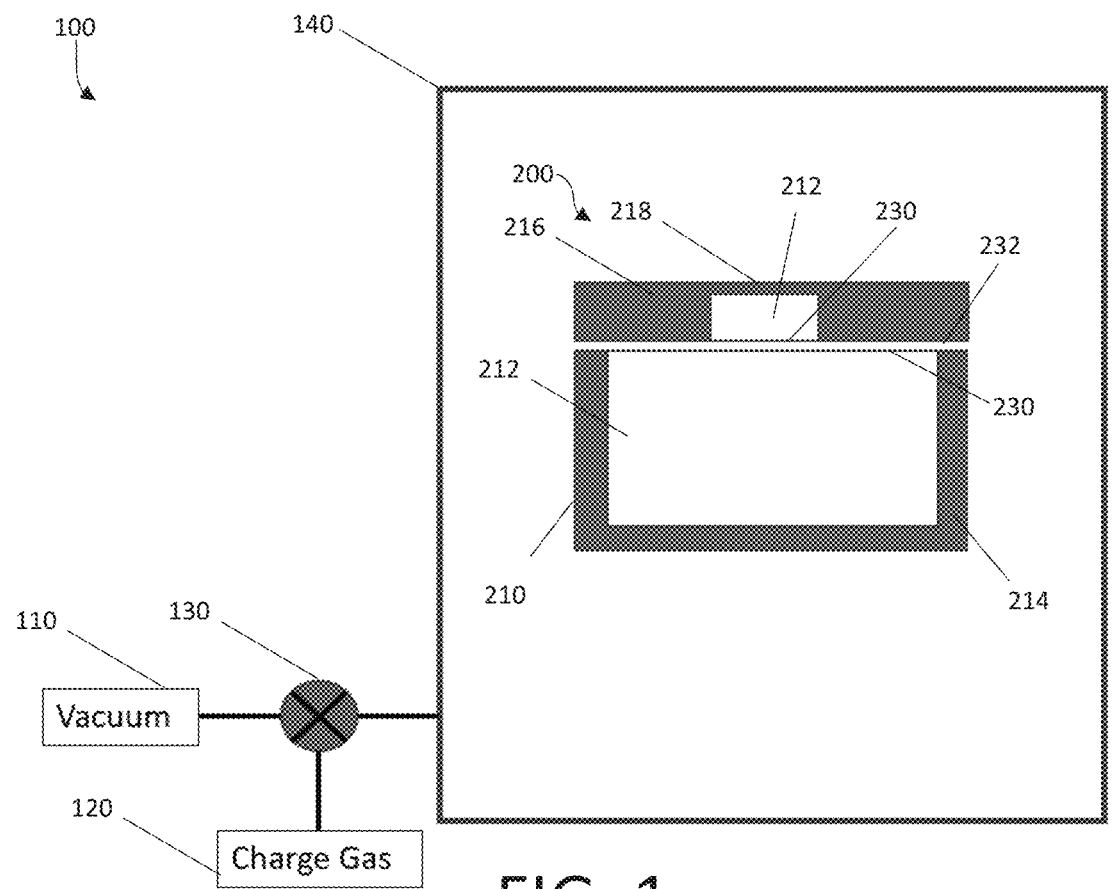
FIG. 1 is a schematic view of an example system consistent with the present technology.

The present technology is related to a gas replenishment component that can supply and control the release of a gas that might be beneficial to the surrounding environment. The surrounding environment can be an electronic enclosure such as a disk drive. The gas replenishment component can be configured to passively release gas into the surrounding environment. The gas replenishment component is configured to slowly diffuse gas in the surrounding environment.

In some examples the gas replenishment component is configured to controllably release oxygen ($O_2$) into an electronic enclosure. The released oxygen may facilitate oxidation of contaminants within the enclosure. In some examples the gas replenishment component is configured to have a controlled release of helium (He). The gas replenishment component can be configured to release both He and $O_2$. The gas replenishment component can be configured to release other types of gases as well. In some embodiments the gas replenishment component is also configured to adsorb contaminants from the surrounding environment.

The gas release of the gas replenishment component is generally slow and extends over a relatively long period of time that can be consistent with the expected operating life of the environment within which the gas replenishment component is intended to operate. For example, in the context of a gas replenishment component that is configured to release $O_2$, the release of $O_2$ may be around 4 cubic centimeters of $O_2$ released a year. The release of $O_2$ will generally be greater than about 1 $cm^3$ a year. The release of $O_2$ can be less than about 20 $cm^3$ a year, 15 $cm^3$ a year, or 10 $cm^3$ a year.

Example disk drives consistent with the current technology generally define a drive volume and main body defining a containment volume positioned within the drive volume. The containment volume may be charged with a gas ("charging gas"). The main body is configured so that the charging gas diffuses or otherwise travels from the containment volume to the drive volume. In particular, the main body defines a diffusive area that is permeable at least to the charging gas(es). The portions of the main body that are not the diffusive area can be substantially impermeable to charging gases. The diffusive area can have a permeability that is double the permeability of the portions of the main body that are not the diffusive area, for example.

The diffusive area is generally configured to diffuse the charging gas(es) at a particular diffusion rate. The diffusive area can be a diffusion channel defined by the main body, which extends from outside the main body to the containment volume. The diffusion channel can be configured to fluidly couple the drive volume and the containment volume. The diffusive area can also be a permeable portion of the main body that does not define an opening, meaning that the main body does not define a perceptible opening from the containment volume to outside of the gas replenishment component (but may have microscopic pores). The permeable portion of the main body is configured to accommodate gaseous diffusion therethrough. The portions of the main body that are not the diffusive area are configured to substantially obstruct diffusion of charging gases therethrough.

The thickness of a material can contribute to its permeability for use as a diffusive area. In some embodiments, the diffusive area can be defined by a portion of the main body that has a thickness that is less than the surrounding areas. For example, a diffusive area of a main body may have a thickness of 1 mm or less, while the surrounding, non-diffusive areas may have a thickness of at least 2 mm, for example.

In some embodiments, the diffusive area is defined by a polymer film that forms a portion of the main body between the drive volume and the containment volume. The polymer film can be configured to accommodate gaseous diffusion therethrough. To obtain a desired diffusion rate for a particular gas, a polymer having a relatively high diffusion rate for that gas can be coated with a substantially impermeable plastic or metal to reduce the gas diffusion rate. The remaining uncoated area of the polymer can dictate the resulting gas diffusion rate of the gas replenishment component. In some embodiments main body can be constructed of a metal frame component defining openings covered by one or more gas permeable materials defining the diffusive area of the component.

In some examples the gas replenishment component has a main body that is entirely or mostly constructed of a material that is configured to diffuse gas therethrough. In such embodiments the main body does not define an opening. In some such embodiments, the main body can be constructed of polycarbonate, for example. In such an example, the polycarbonate defines the diffusive area of the component. Polycarbonate can define the containment volume. As an example, polycarbonate can have $O_2$ permeability consistently with what is known in the art (see, for example, http://en.labthink.com/en-us/literatures/Ddta-report-for-oxygen-permeability-test-of-polycarbonate.html, incorporated herein by reference). In another such example, the main body can be constructed of polyetherimide. In another such example, the main body can be constructed of polyetherimide. In another such example, the main body can be constructed of polyethylene terephthalate.

The main body is generally sealed about the containment volume prior to installation of the component in its intended operating environment. A reversible seal is generally disposed over the diffusive area of the gas replenishment component. The reversible seal is configured to prevent escape of the charging gases from the main body until installation of the component in its intended operating environment. The reversible seal can be a removable adhesive film, for example, that is coupled to the main body over the diffusive opening. The adhesive film can be manually or otherwise detached from the main body to expose the diffusive opening for installation of the component. The reversible seal can be a material over the diffusive opening that is configured to be punctured to expose the diffusive opening for installation of the component.

In various embodiments the containment volume can be at the same pressure as the pressure in the intended operating environment of the gas replenishment component (such as an electronic enclosure). In some embodiments, the gas in the containment volume can be at a higher pressure than the pressure in the intended operating environment. In some embodiments the pressure in the containment volume ranges from about 85 kPa to 1000 kPa. In some embodiments the pressure in the containment volume ranges from about 90 kPa to about 110 kPa. The pressure of the containment volume compared to the pressure of the drive volume is generally a factor in the diffusion rate of the particular charging gas.

In some embodiments, the charging gas can have a partial pressure that exceeds the partial pressure of the gas at atmospheric conditions at sea level. For example, in embodiments where the containment volume is charged with $O_2$, the partial pressure of $O_2$ in the containment volume may be greater than 21.3 kPa.

In examples where the particular charging gas is $O_2$, the $O_2$ in the containment volume can be at the same partial pressure as the partial pressure of $O_2$ in the intended operating environment such as the electronic enclosure. The $O_2$ in the containment volume can be at a higher partial pressure that the partial pressure of $O_2$ in the enclosure. In examples where the charging gas is He, the He in the containment volume can be at about the same partial pressure as the partial pressure of He in the drive volume. The He in the containment volume can be at a higher partial pressure than the partial pressure of He in the drive volume. The pressure of the containment volume compared to the pressure of the drive volume is generally a factor in the He diffusion rate. In some embodiments the containment volume has a pressure ranging from 90 kPa-110 kPa.

In some implementations of the present technology, the containment volume is charged with a mixture of $O_2$ and He. The gas in the containment volume can be from 2%-25% $O_2$ and 75%-98% He by mass. In some other embodiments, the containment volume can be from 25%-45% $O_2$ and 55%-75% He by mass. In yet other embodiments, the containment volume can be from 15%-25% $O_2$ and 75%-85% He by mass. In various embodiments the gas in the containment volume is at least 95% $O_2$, He, or both $O_2$ and He. In various embodiments the gas in the containment volume is at least 99% $O_2$, He, or a combination of $O_2$ and He. The gas in the containment volume will generally have a relatively low amount of nitrogen ($N_2$). The gas in the containment volume is generally less than 5% $N_2$ by mass. In some embodiments, the gas has less than 3% $N_2$. The gas in the containment volume may only have trace amounts of $N_2$, meaning less than 1% $N_2$.

In some embodiments, the containment volume can have an adsorbent disposed therein. The adsorbent is generally configured to contain a particular gas in its pore structure. The adsorbent can be charged with the particular gas before disposing the adsorbent in the containment volume. The adsorbent can be charged with the particular gas after disposing the adsorbent in the containment volume. In embodiments where the containment volume has an adsorbent, the adsorbent can be configured to have an affinity for some gases over other gases. For example, the adsorbent can be configured to have a stronger affinity for contaminant gases over the gas that the adsorbent is charged with. In such examples, as the adsorbent is exposed to contaminant gases, it is configured to release the charged gas into the containment volume in favor of adsorbing the contaminant gases.

In examples where the gas replenishment component is configured for use within a disk drive enclosure, the adsorbent can be configured to have a stronger affinity for nitrogen ($N_2$), carbon dioxide ($CO_2$), or both $N_2$ and $CO_2$, over $O_2$. In such configurations, as the contaminants are adsorbed by the adsorbent over the life of the disk drive, $O_2$ is correspondingly released from the adsorbent. In particular, if the adsorbent has an affinity for $CO_2$ over $O_2$, for example, the adsorbent removes the $CO_2$ that is generated by the disk drive and correspondingly releases the $O_2$. The $O_2$ diffuses out of the containment volume, into the drive volume, and can oxidize other contaminants in the drive volume.

In some implementations described herein the adsorbent contains silica gel. Example adsorbent can contain, for example, a metal organic framework, molecular sieves and activated carbon. Suitable adsorbents can contain combinations of silica gel, molecular sieves, and/or activated carbon. In various examples, the adsorbent is formed into a compression-molded tablet. Other suitable adsorbent can be adsorbent webs, adsorbent beads, adsorbent granulars, powders, other forms of adsorbents, and combinations thereof.

There are a variety of approaches that can be used to charge an adsorbent with a gas. As one example, after an adsorbent has been formed consistently with approaches known in the art, it can be dried in a drying environment, such as an oven. In some embodiments the adsorbent is dried by heating the adsorbent in the drying environment. The drying environment can be at a temperature of greater than 60° C. The drying environment can be at a temperature ranging from 90° C.-130° C. or 100° C.-120° C. In some embodiments the drying environment is under a partial vacuum. Heating the adsorbent under a partial vacuum contributes to the evaporation of liquid moisture and evacuation of moisture vapor and other gases from the adsorbent.

The adsorbent is generally charged with gas. The gas can be one or more types of gas. As such, the adsorbent is generally configured to adsorb the charging gas(es). More particularly, the adsorbent can be configured to accommodate the gas(es) in its pore structure. The adsorbent is generally charged with gas(es) after drying the adsorbent. The adsorbent can be charged with one or more particular gases in a charging environment. The charging environment can be the same environment as the drying environment, or the charging environment can be a different environment from the drying environment. In various embodiments, the gas is introduced to the charging environment and the adsorbent adsorbs at least a portion of the introduced gas.

In some embodiments, the temperature of the adsorbent is lowered for charging. Lowering the temperature of the adsorbent can advantageously increase the mass of gas adsorbed by the adsorbent. In some embodiments the temperature of the charging environment ranges from 10° C.-30° C. In some embodiments the temperature of the charging environment is no less than −50° C. Generally the temperature of the charging environment is less than or equal to the temperature of the drying environment. In some embodiments, the temperature of the drying environment is lowered to create the charging environment.

The charging environment is under a partial vacuum, in some examples. The charging environment can be under ambient pressure, in some examples. In some other examples, the charging environment can have a higher pressure than ambient pressure. In various embodiments the charging environment has a pressure ranging from 80 kPa to 110 kPA. Charging the adsorbent under a higher pressure than a partial vacuum may advantageously increase the mass of charged gas adsorbed by the adsorbent.

In some embodiments, the charging gas is introduced within the partial vacuum of the drying environment to form the charging environment. In some embodiments, the partial vacuum is eliminated in the drying environment, which forms the charging environment. In some embodiments, the charging gas is added to the drying environment in an amount that increases the pressure to reduce the partial vacuum or remove the partial vacuum. In some embodiments the drying environment is pressurized to form the charging environment. In some other embodiments, however, the drying environment is at the same pressure as the charging environment.

In some examples, the adsorbent is charged with gas using a vacuum sealer. In such an example, the adsorbent is placed in flexible, substantially gas impermeable housing such as a bag that is in fluid communication with the vacuum sealer. A gas flow line can also be in fluid communication with the bag. Such a system can repeatedly cycle between a vacuuming stage and a loading stage. In the loading stage gas is pumped into the bag, allowing absorption of the gas by the adsorbent. In the vacuuming stage, gas is removed from the bag. Such a process can result in a relatively high gas concentration in the pore structure of the adsorbent.

The adsorbent is generally inserted in a containment volume of a main body of a gas replenishment component. In some embodiments, the adsorbent is inserted in the containment volume of the main body prior to drying the adsorbent. In such an example, the main body having the adsorbent is placed in the drying environment. The main body defines a charging area extending from outside the main body to the containment volume such as an opening in the main body or a permeable portion of a wall that does not have a perceptible opening. The charging area is configured to allow (1) the release of moisture vapor and other gases from the containment volume and (2) the passage of the charging gas from outside the main body to the adsorbent. Both the containment volume and the adsorbent can be evacuated of moisture and gases in the drying environment. In some embodiments, the adsorbent is inserted in the containment volume of the main body after drying the adsorbent and before charging the adsorbent. In such an example, the process of charging the adsorbent can also fill the containment volume with the charging gas. In some embodiments, the adsorbent is inserted in the containment volume of the main body after charging the adsorbent. The main body can be consistent with those described elsewhere herein.

The adsorbent is generally sealed in the main body. The adsorbent can be sealed in the main body to advantageously isolate the containment volume until installation and use in an electronic enclosure. In some embodiments, the adsorbent is sealed in the main body after drying the adsorbent. In some embodiments, the adsorbent is sealed in the main body after charging the adsorbent. In some such embodiments, the adsorbent is sealed in the main body after also charging the containment volume of the main body. In some examples, the main body can define a charging area, such as an opening or a gas permeable wall portion lacking a perceptible opening, through which gas is passed to charge the adsorbent and the containment volume. A seal can be disposed over the charging area after charging the adsorbent. The charging area can be the diffusive area of the main body, or a larger, non-diffusive opening in the main body.

Subsequent to charging the adsorbent, the seal can be formed over the charging area. The seal can be removable or non-removable. In an example, the seal is a first portion of the main body that is welded, adhered, soldered, crimped, or otherwise sealed to a second portion of the main body around the adsorbent. In another example, the seal is an adhesive film that is coupled to the main body about the charging area. Where the charging area is an opening in the main body, the adhesive film can form a permanent seal with the main body. Where the charging area is a diffusive area of the main body, the adhesive film can be removably coupled to the main body. Upon installation in an electronic enclosure, the adhesive film can be removed to expose the diffusive area. In some embodiments, where a relatively large area of the main body is a diffusive area and, as such, is permeable to the charging gas, the main body can be placed in a non-permeable container to prevent release of the charging gas prior to installation in an electronic enclosure.

As another example of sealing the adsorbent in the containment volume after charging the adsorbent, the main body can have a self-sealing septum through which the gas is injected with an injection tool through the self-sealing septum to charge the adsorbent. The self-sealing septum can form a seal upon retraction of the injection tool from the septum.

In some embodiments the adsorbent can be pre-loaded with $O_2$ by storing the adsorbent in a relatively cold and $O_2$-rich environment. Over time the adsorbent can adsorb $O_2$. After a particular time period has passed, the adsorbent can then be placed in the containment volume and then sealed. After insertion in the disk drive, the containment volume can be unsealed. As the adsorbent is warmed upon installation in the disk drive, it will release some of the pre-loaded $O_2$, which will partially purge the containment volume and/or drive volume until the cover or plug is sealed. Such a method can eliminate the need for a disk drive purging system and it would offer a more predictable and controlled means to insert the $O_2$, as the release of $O_2$ from the adsorbent would be at a controlled rate and the cold temperature of the adsorbent can reduce flammability of the $O_2$ in some instances.

The containment volume can have a variety of different configurations. In some embodiments, the containment volume can be a canister disposed within the drive volume. The canister can be a metal or glass vessel with a polymer plug, where the polymer plug is permeable to $O_2$ and is configured to have a desired diffusion rate. The vessel can contain pressurized $O_2$, in some embodiments.

In some embodiments, the containment volume can be formed into a pouch with a flexible film. The pouch can resemble a balloon, in some embodiments. In some such embodiments, the pouch can be constructed of a thin polymer film. The thin polymer film can be polyester film and/or a resin polyethylene terephthalate film. In some of those embodiments, a portion of the film can be coated with metal to modify the transmission rate of $O_2$. Alternatively, the entire surface of the pouch can be coated with a metal coating, and at particular locations the metal coating can be removed to define areas that allow transmission of $O_2$. In some embodiments, the containment volume can be constructed of a first film having a relatively low $O_2$ transmission rate and a second film having a relatively higher $O_2$ transmission rate. The combination of the two films areas can allow for the $O_2$ transmission rate to be precisely adjusted.

The containment volume is generally configured to be in diffusive communication with an electronic enclosure. In some such embodiments, the containment volume may be sealed after charging the adsorbent with the charging gas until installation in the enclosure. Immediately prior to insertion or after insertion into the enclosure, the reversible seal is removed from the diffusive area to create gas communication between the containment volume and the enclosure volume.

In one specific example, the containment volume defines a charging opening, which is also a diffusion area, through which the containment volume is charged with $O_2$. Upon charging the containment volume, the charging opening/diffusion area is sealed with an adhesive seal across the opening. Immediately prior to or after installation of the gas replenishment component in the enclosure, the seal is removed or punctured to allow fluid communication between the containment volume and the enclosure volume. In another example embodiment, the gas replenishment component is installed in the enclosure volume, the enclosure volume is purged with helium, and then the reversible seal is punctured to allow fluid communication between the containment volume and the enclosure volume.

FIG. 1 is a schematic view of an example system 100 consistent with the present technology. The system 100 can be used in the construction of a gas replenishment component 200 consistent with various aspects of the technology disclosed herein. The gas replenishment component 200 has a main body 210 defining a containment volume 212. The containment volume 212 is configured to be charged with one or more charging gases. The main body 210 of the gas replenishment component 200 has a diffusive area 218 that is configured accommodate gas diffusion there-through and diffuse the charging gases released from the containment volume 212. In the current example, the gas replenishment component 200 lacks an adsorbent disposed in the containment volume 212.

The system 100 is generally configured to dry and charge the gas replenishment component 200. In particular, the system has a vacuum 110 and a charge gas source 120 in gaseous communication with a chamber 140 of the system 100. One or more valves 130 can operatively couple each of the vacuum 110 and the charge gas source 120 to the chamber 140. The gas replenishment component 200 is disposed in the chamber 140. The chamber 140 serves as both a drying environment and a charging environment, although in some other embodiments the drying environment and the charging environment can be separate chambers.

The gas replenishment component 200 has a first portion 214 and a second portion 216 that are initially detached, but are configured to form a seal around the containment volume 212. When the first portion 214 and the second portion 216 are detached, one or more charging areas 230 allows fluid communication between the containment volume 212 and the environment outside the main body 210, which is the chamber 140 environment.

The first portion 214 and the second portion 216 can be positioned in the chamber 140 for drying and charging operations. During the drying operation, the valve 130 can establish fluid communication between the vacuum 110 and the chamber 140. The vacuum 110 applies a partial vacuum to the chamber 140, which subjects the main body 210 to the partial vacuum. Heat can also be applied to the chamber 140 during the drying operation. The drying operation, including the relevant pressures and temperatures used, can be similar to the discussion above related to drying an adsorbent. The drying operation is generally configured to evaporate moisture and evacuate moisture vapor and other gases from the main body 210 and the containment volume 212.

After the drying operation, the system 100 is configured to execute a charging operation, where the gas replenishment component 200 is charged with one or more gases. The valve 130 obstructs fluid communication between the vacuum and the chamber. The valve 130 establishes fluid communication between the charge gas source 120 and the chamber 140. The charge gas source 120 can include a pump that is configured to pump the charging gas to the chamber 140 via the valve 130. The charge gas source 120 can pump the charging gas into the chamber 140 to achieve a particular chamber pressure. The charging gas can be consistent with other charging gases discussed elsewhere herein.

The chamber 140 temperature for the charging operation can be consistent with temperatures discussed above with reference to a charging environment for an adsorbent. In some embodiments, the chamber 140 is actively cooled with a cooling system after the drying operation. In some other embodiments, the chamber 140 is passively cooled after the drying operation, meaning that the heating system from the drying operation is merely turned off.

The chamber 140 pressure for the charging operation can be consistent with pressures discussed above with reference to a charging environment for an adsorbent. Because there is open fluid communication between the chamber 140 volume and the containment volume 212 through the charging area 230, the pressure in the chamber 140 and the containment volume 212 are equal. Similarly, the gases that are present in the chamber 140 volume are present in the containment volume 212.

In the current example, the gas replenishment component 200 has a first portion 214 and a second portion 216 that are configured to be sealed around the containment volume 212. Upon charging the chamber 140 and, therefore, the gas replenishment component 200, the containment volume 212 is sealed. The containment volume 212 is sealed by sealing the first portion 214 to the second portion 216 to isolate the containment volume 212 from the environment outside of the main body 210. The first portion 214 of the main body 210 can be welded, adhered, soldered, crimped, or otherwise sealed to the second portion 216 of the main body 210 around the containment volume 212. The first portion 214 can be sealed to the second portion 216 within the chamber 140, in some embodiments. In some other embodiments, the first portion 214 and the second portion 216 can be sealed immediately after removal from the chamber 140 to limit intrusion of ambient gases into the containment volume 212.

In the current example, the first portion 214 and the second portion 216 can be constructed of the same materials or different materials. In the current example, when the first portion 214 and the second portion 216 are sealed, the gas replenishment component does not define any perceptible openings. The second portion 216 defines a diffusive area 218 that is configured to accommodate diffusion of charging gases therethrough. The portions of the main body 210 that are not the diffusive area 218 are configured to substantially obstruct diffusion of charging gases therethrough. In the current example, the diffusive area 218 is a region of the second portion 216 having a reduced thickness (in the vertical direction relative to the figure) compared to the surrounding area. The thickness of the diffusive area 218 can be chosen based on a target permeability and/or diffusion rate based on factors such as internal pressure, expected pressure in the intended operating environment, target operational life of the component, specific gas molecules targeted, and the like.

In various embodiments, the diffusive area 218 of the main body 210 is reversibly sealed prior to or shortly after removal of the gas replenishment component 200 from the chamber. The diffusive area 218 of the main body 210 is reversibly sealed to isolate the containment volume from the external environment until installation of the gas replenishment component 200 in its intended operating environment. The seal can be an adhesive film, for example, that adheres to the main body 210 over and around the diffusive area 218. The adhesive film can be removed upon installation of the gas replenishment component 200 in its intended operating environment.

Figure 2:
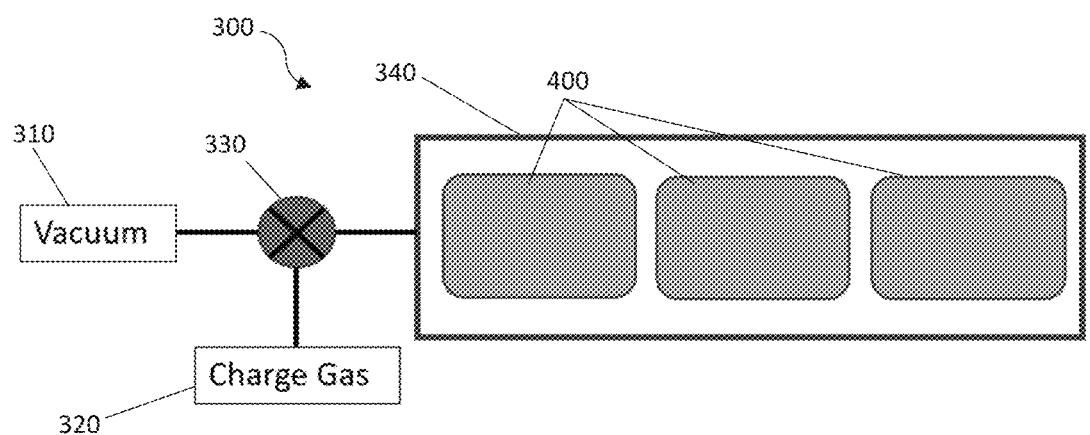
FIG. 2 is a schematic view of another example system consistent with the present technology.

FIG. 2 is a schematic view of another example system 300 consistent with the present technology. The system 300 can be used in the construction of a gas replenishment component consistent with various aspects of the technology disclosed herein. The system 300 can be used to dry and charge one or more adsorbents 400, where the adsorbents 400 can be incorporated in gas replenishment components.

As with the system described with reference to FIG. 1, the system 300 here has a vacuum 310 and a charge gas source 320 in gaseous communication with a chamber 340 of the system 300 through one or more valves 330. One or more adsorbents 400 are disposed in the chamber 340. The chamber 340 serves as both a drying environment and a charging environment, although in some other embodiments the drying environment and the charging environment can be separate chambers.

The drying operation is generally configured to evaporate moisture and evacuate moisture vapor and other gases from the adsorbent 400. During the drying operation, the valve 330 establishes fluid communication between the vacuum 310 and the chamber 340. The vacuum 310 applies a partial vacuum to the chamber 340, which subjects the adsorbent 400 to the partial vacuum. Heat can also be applied to the chamber 340 during the drying operation. The drying operation, including the relevant pressures and temperatures used, can be similar to those discussed above with reference to FIG. 1.

After the drying operation, the system 300 is configured to execute a charging operation, where the adsorbent(s) 400 is charged with one or more gases. The valve 330 obstructs fluid communication between the vacuum 310 and the chamber 340. The valve 330 establishes fluid communication between the charge gas source 320 and the chamber 340. The charge gas source 320 can include a pump that is configured to pump the charging gas to the chamber 340 via the valve 330. The charge gas source 320 can pump the charging gas into the chamber 340 to achieve a particular chamber pressure. The charging gas can be consistent with other charging gases discussed elsewhere herein.

The chamber 340 temperatures and pressures for the charging operation can be consistent with temperatures discussed above with reference to a charging environments for adsorbents and/or gas replenishment components. As such, the chamber 340 can be actively or passively cooled during the charging operation. The charging gases within the chamber 340 can be adsorbed by the adsorbent(s) 400 to charge the adsorbent(s) 400.

Upon charging the chamber 340 and, therefore, the adsorbent(s) 400, each adsorbent 400 can be installed in a main body of a gas replenishment component. In various embodiments, each adsorbent 400 is removed from the chamber 340 and sealed in a containment volume of a main body, consistently with approaches already disclosed herein. This step can be done relatively quickly to limit the amount of charging gas that is desorbed by the adsorbent after removal from the chamber 340.

Figure 3:
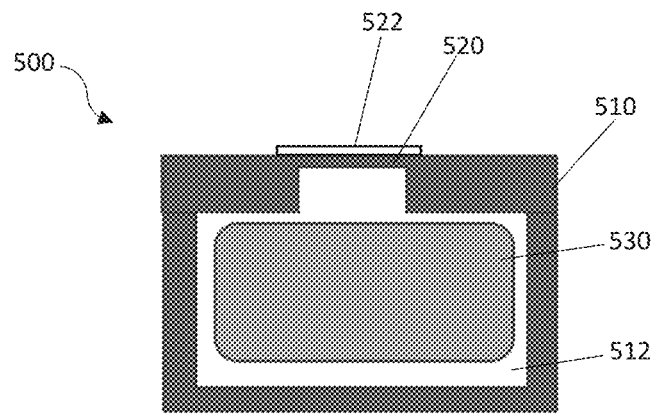
FIG. 3 is an example gas replenishment component consistent with various embodiments.

FIG. 3 is an example gas replenishment component 500 consistent with various embodiments. The gas replenishment component 500 can be configured to replenish a gas in an electronic enclosure, for example. The gas replenishment component 500 has a main body 510 defining a containment volume 512. The main body 510 is generally sealed about the containment volume 512. A charging gas is generally contained in the containment volume 512. The charging gas can be consistent with other charging gases discussed herein. The containment volume generally has less than 5% $N_2$. In various embodiments, the containment volume 512 has a pressure of at least 85 kPa.

The main body defines a diffusive area 520 that is permeable to the charging gas. Similar to FIG. 1, discussed above, here the diffusive area 520 is an area defined by a portion of the main body 510 that is thinner than surrounding areas. A reversible seal 522 obstructs the diffusive area 520. The reversible seal 522 is configured to prevent gaseous communication between the containment volume 512 and the environment outside of the main body 510.

In the current example, the gas replenishment component 500 has an adsorbent 530 disposed in the containment volume 512. The adsorbent 530 stores at least a portion of the charging gas.

Figure 4:
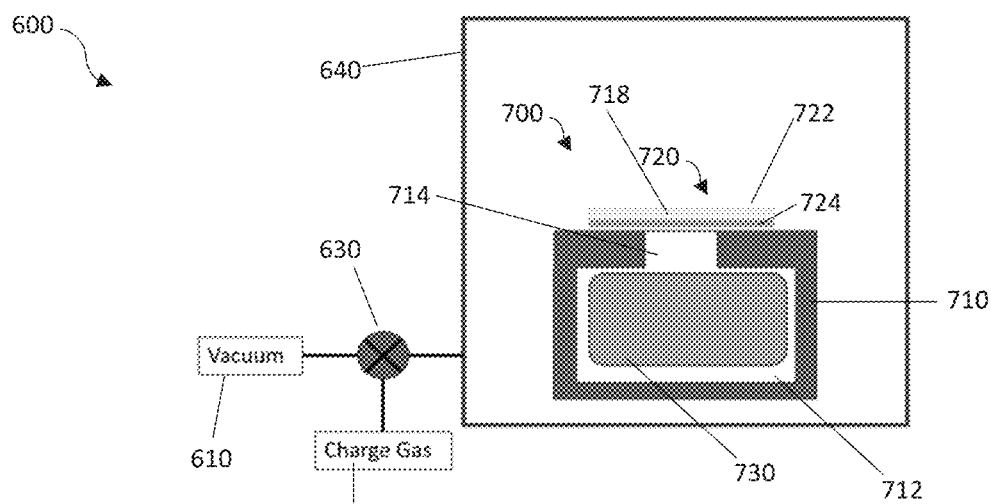
FIG. 4 is another example system consistent with the present technology.

FIG. 4 is another example system shown schematically that is consistent with the present technology. The system 600 can be used in the construction of a gas replenishment component 700 consistent with various aspects of the technology disclosed herein. The gas replenishment component 700 has a main body 710 defining a containment volume 712. The containment volume 712 is configured to be charged with one or more charging gases. The main body 710 of the gas replenishment component 700 has a diffusive area 718 that is configured accommodate gas diffusion there-through and diffuse the charging gases released from the containment volume 712. In the current example, the diffusive area 718 is defined by a diffusive film 724 that is coupled to an opening 714 defined in the main body 710. A reversible seal 722 is coupled to the main body 710 to obstruct the opening 714. In the current example, the gas replenishment component 700 has an adsorbent 730 disposed in the containment volume 712.

As with the system described with reference to FIG. 1, the system 600 here has a vacuum 610 and a charge gas source 620 in gaseous communication with a chamber 640 through one or more valves 630. The system 600 is generally configured to dry and charge the gas replenishment component 700. The drying operation and the charging operation are generally executed as discussed above with reference to FIG. 1. However, in the current example, the gas replenishment component 700 is largely assembled prior to drying and charging. The reversible seal 722 and the diffusive film 724 are unattached for the main body 710 for the drying and charging operations, allowing the opening 714 to be used as the charging area. During the drying operation, the opening 714 allows moisture vapor and other gases to evacuate the containment volume 712. During the charging operations, the charging gases that are introduced into the chamber 640 pass through the opening 714 into the containment volume 712. Following the drying and charging operations, the reversible seal 722 and the diffusive film 724 are coupled to the main body 710 to obstruct the opening 714 and isolate the containment volume from the environment surrounding the main body 710. The reversible seal 722 can be detached from the diffusive film 724 for installation of the gas replenishment component 700 in an enclosure.

Figure 5:
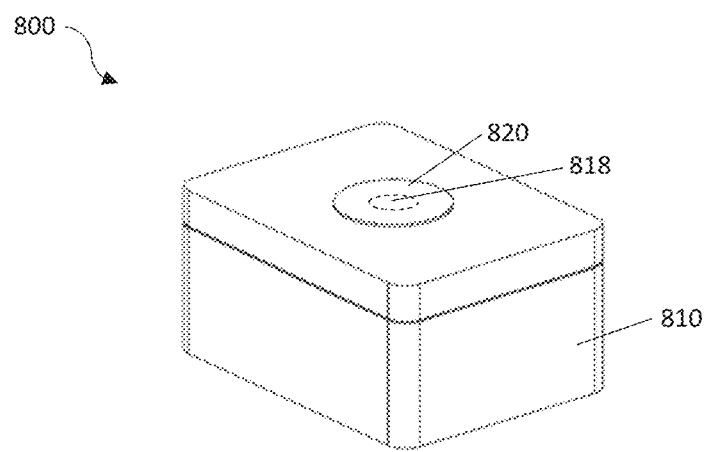
FIG. 5 is a perspective view of an example oxygen replenishment component consistent with embodiments.
Figure 6:
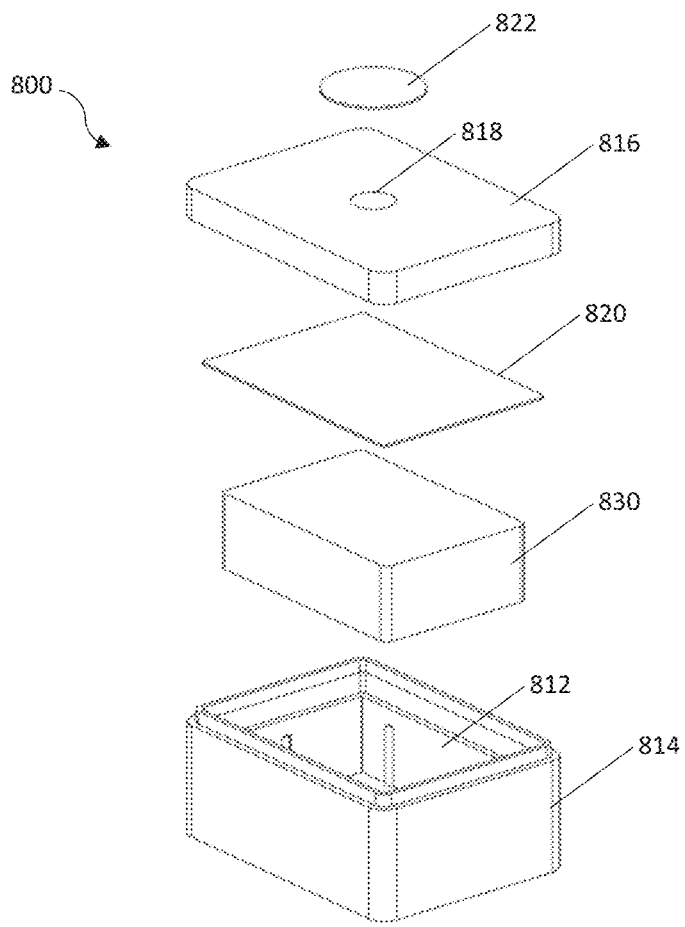
FIG. 6 is an exploded view of an example oxygen replenishment component consistent with FIG. 5.

FIG. 5 is a perspective view of an example gas replenishment component 800 consistent with embodiments, and FIG. 6 is an exploded view of an example gas replenishment component 800 consistent with FIG. 5. An adsorbent 830 is disposed in a containment volume 812 defined between a main body 810 (specifically a first portion 814 of the main body 810) and a filter layer 820 coupled to the main body 810 across the containment volume 812. A cover 816, which is a second portion 816 of the main body 810 is coupled to the first portion 814 of the main body 810 over the filter layer 820. The filter layer 820 and the adsorbent 830 are disposed between the first portion 814 and the second portion 816 of the main body 810. The adsorbent 830 is positioned between the filter layer 820 and the first portion 814 of the main body 810.

The main body 810 can be constructed of a variety of types of materials and combinations of materials. In some embodiments the main body 810 is constructed of plastic such as polycarbonate. The filter layer 820 is generally configured to contain particles of the adsorbent 830 within the main body 810, while allowing diffusion there-through. The filter layer 820 can be a variety of types of filtration material and combinations of types of filtration material. In an example, the filter layer 820 is a membrane such as polytetrafluoroethylene (PTFE). The cover 816 can be constructed of the same material as the first portion 814 of the main body 810, such as plastic.

The cover 816 defines a cover opening 818 that is configured to accommodate airflow therethrough. The filter layer 820 extends across the cover opening 818 to define a diffusive area (also denoted by reference number 818 and shown with dashed lined in FIG. 5) of the gas replenishment component 800.

A reversible seal 822 is disposed across the diffusive area 818. The reversible seal 822 is configured to isolate the containment volume 812 from the outside environment. The reversible seal 822 can be a substantially impermeable film coupled to the main body with an adhesive, for example. In some other embodiments the reversible seal can be a substantially impermeable film that is a puncturable material. The cover opening 818 can be used for drying and charging the gas replenishment component 800, and can be covered with the reversible seal 822 following such operations.

In some alternate examples, the cover opening can be covered with a breather filter that defines a diffusion area of the gas replenishment component. The breather filter can define a tortuous flow path from the containment volume to the outside environment. The cover opening can be used for drying and charging the adsorbent with $O_2$ and can be covered with the breather filter before or after the charging operation. In some such embodiments, a reversible seal is disposed across the tortuous flow path of the breather filter at the time the cover opening is covered with the breather filter. The a seal can be removed during or prior to installation of the air replenishment component in an electronic enclosure, such as a disk drive, by puncturing the seal or detaching the seal.

Exemplary Embodiments

Embodiment 1. A gas replenishment component for an electronic enclosure, comprising:
  a main body defining a containment volume, wherein the main body is sealed about the containment volume;
  a charging gas contained in the containment volume, wherein the containment volume has less than 5% $N_2$, wherein the main body defines a diffusive area that is permeable to the gas; and
  a reversible seal obstructing the diffusive area.

Embodiment 2. The gas replenishment component of any one of embodiments 1 and 3-8, further comprising an adsorbent disposed in the containment volume, wherein the charging gas is at least partially stored by the adsorbent.

Embodiment 3. The gas replenishment component of any one of embodiments 1-2 and 4-8, wherein the charging gas comprises $O_2$.

Embodiment 4. The gas replenishment component of any one of embodiments 1-3 and 5-8, wherein the charging gas comprises He.

Embodiment 5. The gas replenishment component of any one of embodiments 1-4 and 6-8, wherein the containment volume has a pressure ranging from 85 kPa to 1000 kPa.

Embodiment 6. The gas replenishment component of any one of embodiments 1-5 and 7-8, wherein the main body does not define an opening and is constructed of a material that is configured to diffuse the charging gas therethrough.

Embodiment 7. The gas replenishment component of any one of embodiments 1-6 and 8, wherein the main body is constructed of polycarbonate.

Embodiment 8. The gas replenishment component of any one of embodiments 1-7, further comprising a removable seal, wherein the main body defines a diffusion channel extending from outside the main body to the containment volume, and the removable seal is disposed across the diffusion channel.

Embodiment 9. A method of constructing a gas replenishment component comprising:
  drying an adsorbent by heating the adsorbent under a partial vacuum;
  charging the dried adsorbent with a gas;
  inserting the adsorbent in a containment volume of a main body; and
  sealing the adsorbent in the main body.

Embodiment 10. The method of any one of embodiments 9 and 11-21, wherein charging the dried adsorbent with gas comprises injecting the gas through a self-sealing septum of the main body.

Embodiment 11. The method of any one of embodiments 9-10 and 12-21, wherein charging the adsorbent with gas comprises lowering the temperature of the adsorbent.

Embodiment 12. The method of any one of embodiments 9-11 and 13-21, wherein charging the adsorbent with gas comprises increasing the pressure on the adsorbent.

Embodiment 13. The method of any one of embodiments 9-12 and 14-21, further comprising filling the containment volume with He to pressurize the containment volume.

Embodiment 14. The method of any one of embodiments 9-13 and 15-21, wherein the gas comprises $O_2$.

Embodiment 15. The method of any one of embodiments 9-14 and 16-21, wherein the gas contained in the main body is at a partial pressure that exceeds the partial pressure of the gas at atmospheric conditions at sea level.

Embodiment 16. The method of any one of embodiments 9-15 and 17-21, wherein the main body does not define an opening and is constructed of a material that is configured to diffuse the gas therethrough.

Embodiment 17. The method of any one of embodiments 9-16 and 18-21, wherein the main body is constructed of polycarbonate.

Embodiment 18. The method of any one of embodiments 9-17 and 19-21, further comprising disposing a seal across a diffusion channel, wherein the main body defines the diffusion channel that extends from outside the main body to the containment volume.

Embodiment 19. The method of any one of embodiments 9-18 and 20-21, further comprising removing a reversible seal from the main body to expose a diffusive area of the main body.

Embodiment 20. The method of any one of embodiments 9-19 and 21, wherein the reversible seal is punctured.

Embodiment 21. The method of any one of embodiments 9-20, wherein the reversible seal is detached from the main body.

It should also be noted that, as used in this specification and the appended claims, the phrase "configured" describes a system, apparatus, or other structure that is constructed to perform a particular task or adopt a particular structure. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A gas replenishment component for an electronic enclosure, comprising:
a main body constructed of a polymer defining a containment volume, wherein the main body is sealed about the containment volume; and
a charging gas contained in the containment volume, wherein the charging gas comprises $O_2$, wherein the main body defines a diffusive area that is permeable to the charging gas, and a non-diffusive area, wherein the diffusive area has a permeability that is at least double the permeability of the non-diffusive area relative to the charging gas, and wherein the polymer has a first thickness defining the diffusive area and the polymer has a second thickness defining the non-diffusive area, and the first thickness is less than the second thickness.

2. The gas replenishment component of claim 1, wherein the partial pressure of the $O_2$ is at least 21.3 kPa.

3. The gas replenishment component of claim 1, wherein the containment volume has a pressure ranging from 85 kPa to 1000 kPa.

4. The gas replenishment component of claim 1, wherein the polymer is polycarbonate.

5. The gas replenishment component of claim 1, wherein the charging gas comprises at least 2% of $O_2$ by mass.

6. The gas replenishment component of claim 1, wherein the charging gas comprises 5% or less of $N_2$ by mass.

7. The gas replenishment component of claim 1, wherein the non-diffusive area has a thickness of at least 2 mm.

8. The gas replenishment component of claim 1, wherein the main body does not define an opening.

9. A method of constructing a gas replenishment component comprising:
forming a main body sealed about a containment volume, wherein the main body is constructed of a polymer and defines a diffusive area that is permeable to a charging gas, and a non-diffusive area, wherein the diffusive area has a permeability that is at least double the permeability of the non-diffusive area relative to the charging gas, and wherein the polymer has a first thickness defining the diffusive area and the polymer has a second thickness defining the non-diffusive area, and the first thickness is less than the second thickness;
charging the containment volume with the charging gas, wherein the charging gas comprises $O_2$; and
sealing the main body about the containment volume and the charging gas.

10. The method of claim 9, wherein the containment volume has a pressure ranging from 85 kPa to 1000 kPa.

11. The method of claim 9, further comprising charging the containment volume with He to pressurize the containment volume.

12. The method of claim 9, further comprising charging the containment volume with at least 2% of $O_2$ by mass to pressurize the containment volume.

13. The method of claim 9, wherein each charging gas contained in the main body is at a partial pressure that exceeds the partial pressure of the charging gas at atmospheric conditions at sea level.

14. The method of claim 9, wherein the polymer is polycarbonate.

15. The method of claim 9, further comprising drying an adsorbent by heating the adsorbent under a partial vacuum;
charging the dried adsorbent with the charging gas, wherein the charging gas is at least partially stored by the adsorbent; and
inserting the adsorbent in the containment volume of the main body.

16. The method of claim 9, wherein the main body does not define an opening.

* * * * *